United States Patent [19]

Kaya

[11] Patent Number: 5,564,643
[45] Date of Patent: Oct. 15, 1996

[54] PHOTO FILM CASSETTE HAVING A FILM TRAILER ATTACHING ASSEMBLY

[75] Inventor: Akimasa Kaya, Kanagawa, Japan

[73] Assignee: Fuji Photo Film Co., Ltd., Kanagawa, Japan

[21] Appl. No.: 208,382

[22] Filed: Mar. 10, 1994

[30] Foreign Application Priority Data

Mar. 10, 1993 [JP] Japan ................... 5-049665

[51] Int. Cl.⁶ .......................... B65H 75/28; G03B 17/26
[52] U.S. Cl. ..................... 242/348.1; 242/584.1
[58] Field of Search ............... 242/348.1, 348.4, 242/532.4, 532.6, 584.1, 587.1; 354/275

[56] References Cited

U.S. PATENT DOCUMENTS

| | | |
|---|---|---|
| 3,910,516 | 10/1975 | Hoffacker et al. . |
| 4,614,019 | 9/1986 | Shimizu et al. .................. 29/450 |
| 4,834,306 | 5/1989 | Robertson et al. . |
| 4,846,418 | 7/1989 | Fairman . |
| 5,054,710 | 10/1991 | Ikariya et al. ..................... 242/74 |

FOREIGN PATENT DOCUMENTS

| | | |
|---|---|---|
| 0045428 | 2/1982 | European Pat. Off. . |
| 0406815A2 | 7/1990 | European Pat. Off. . |
| 0582852 | 2/1994 | European Pat. Off. . |
| 52-77723 | 6/1977 | Japan . |
| 4122925 | 4/1992 | Japan . |
| 4240185 | 7/1993 | Japan ................................ 354/275 |

*Primary Examiner*—Daniel P. Stodola
*Assistant Examiner*—William A. Rivera
*Attorney, Agent, or Firm*—Sughrue, Mion, Zinn, Macpeak & Seas

[57] ABSTRACT

A photo film cassette contains a spool, on which the photo film is wound as a roll. A cassette shell rotatably contains the spool and the roll of the photo film. Two retaining holes are formed in a trailer of the photo film. A slot is formed in the spool, is extended in an axial direction of the core, receives the trailer, and has a first rigid wall and a second flexible wall. Two retaining hooks are projected from the rigid wall, and are fitted in the respective retaining holes to retain the trailer in the slot. Two preventive ridges are projected from the flexible wall, and avoid disengagement of the retaining holes from the retaining hooks. The trailer is thus firmly secured on the core. The preventive ridges are formed to be retractable away from the rigid wall. The flexible wall has a gap, and defines two flap portions such that an original form is recoverable resiliently. The preventive ridges are disposed on the respective flap portions.

21 Claims, 5 Drawing Sheets

PHOTO FILM CASSETTE HAVING A FILM TRAILER ATTACHING ASSEMBLY

BACKGROUND OF THE INVENTION

1. Field of the Invention

The present invention relates to a photo film cassette, and more specifically to a photo film cassette having a spool on which photo film can be secured easily, a method of loading the film and an apparatus for such loading.

2. Description of the Related Art

Photo film of the 135 type, contained in a cassette, is the most popular type marketed currently. The 135 photo film cassette has a cassette shell constituted of a cylindrical body and two end caps. The cylindrical body is formed of a thin metal plate, with the caps fitted thereon. The cassette has a spool on which photo film is wound in a form of a roll and which is contained in the cassette shell. To assemble this photo film cassette, several methods are known. According to the method disclosed in U.S. Pat. No. 4,614,019 (corresponding to JP-B 2-691) for example, the photo film is first wound on the spool. The cassette is then assembled while covering the photo film within the cassette shell in a darkroom.

U.S. Pat. No. 3,910,516 (corresponding to JP-A 49-107732) and JP-A 52-77723 also suggest a photo film cassette producing method. In this method, a spool is incorporated into an empty cassette in an illuminated room. A tongue-like guide plate is then inserted into a photo film passage port formed in the cassette. Then, in a darkroom, a trailer of photo film is inserted into the cassette while being guided along the guide plate. The trailer is retained on the spool fixedly. The spool is finally rotated to wind the photo film up into the cassette.

It is also suggested by U.S. Pat. Nos. 4,834,306 and 4,846,418 and a commonly assigned European patent application published as EP-A2 0 406 815 (corresponding to JP-A 3-37645) to construct a photo film cassette in which a cassette shell is constituted of parts formed from resin, and rotation of a spool causes a leader of the photo film to exit to the outside of the cassette. Such a leader-advancing cassette is different from photo film cassettes conventionally in use because the leader of the photo film is fully contained within the cassette even before exposure and after exposure. The cassette has advantages in that the photo film is reliably protected from accidental exposure to ambient light. Also, the lack of external protrusion of the leader facilitates handling of the cassette.

The assignee of the present application has proposed a photo film cassette in which a spool has a slot for receiving a trailer of the photo film. In the slot, retaining hooks are formed. Holes formed in the trailer are fitted on the hooks. Also, slip-preventive ridges are formed in opposition to the hooks and at positions beside the hooks. The ridges contact with the trailer, press the trailer against an opposite wall of the slot, and retain the trailer inside the slot in cooperation with the hooks. The trailer is thus prevented from disengagement from the slot, and is reliably secured to the spool.

However, it is difficult to insert the trailer into the above-described spool, mainly due to the arrangement of the hooks and the ridges. The tops of the hooks extend beyond the opposite tops of the ridges, so that the trailer must be bent or curved forcibly before the trailer can be fully inserted into the slot between the hooks and ridges. Even when the trailer is safely inserted, excessive force for the insertion is required. In production of this cassette, the above-described tongue-like guide plate as proposed in U.S. Pat. No. 3,910,516 and JP-A 52-77723 could be used for assistance in the insertion of the trailer into the cassette. However, the guide plate might also be bent or curved inside the slot during guiding the trailer.

There is an alternative proposal as suggested in a commonly assigned U.S. Pat. No. 5,360,183 (corresponding to JP-A-4-122925). A spool disclosed therein has a slot for receiving a trailer. In the slot, retaining hooks and slip-preventive ridges are formed. The hooks are retractable from inside the slot. In the course of advancing the trailer into the slot, the hooks are retracted. When the holes come to the hooks, the hooks are resiliently recovered into the slot, are fitted into the holes, and retain the trailer. This alternative has problems in that the trailer cannot have a stable position inside the slot, and has low reliability in successful engagement with the hooks. Even after the engagement, the hooks can be moved by shock or vibration of the cassette, and the trailer is accidently disengaged from the hooks.

SUMMARY OF THE INVENTION

In view of the foregoing problems, an object of the present invention is to provide a photo film cassette having a spool on which photo film can be secured easily.

Another object of the present invention is to provide a photo film cassette having a spool on which photo film can be secured reliably by a simple structure.

In order to achieve the above and other objects and advantages of this invention, a photo film cassette includes a spool which has a core, photo film of which a trailer is secured to the core and which is wound on the spool in the form of a roll, and a cassette shell for rotatably containing the spool and the roll of the photo film. At least one retaining hole is formed in the trailer of the photo film. A slot is formed in the spool and extends in an axial direction of the core, and has first and second walls. At least one retaining claw is projected from the first wall into the slot, and is fitted in the retaining hole to retain the trailer in the slot. At least one preventive projection is projected from the second wall into the slot to prevent disengagement of the retaining hole from the retaining claw. The preventive protection is retractable away from the first wall.

In a preferred embodiment, the second wall has a cutoff. The spool includes at least one flap portion defined by the cutoff. An original form of the flap portion is recoverable resiliently. The preventive projection is disposed on the flap portion. When a load of 200 grams is applied to the preventive projection, the preventive projection is shifted by at least 1 mm.

In the present invention, the photo film can be secured on the spool easily and reliably, by a simple structure. The trailer will not be bent or curved seriously by the full insertion of the trailer into the slot between the hooks and ridges. The trailer can thus be safely inserted without excessive force.

In a method of loading the photo film into the cassette, the trailer is picked up by a pick-up device. The pick-up device is inserted through the passage port, to insert the trailer into the cassette shell. The pick-up device is inserted into the slot, to retract the preventive projection away from the first wall to mount the trailer on the spool. The pick-up device is then drawn out of the cassette shell, to allow the preventive projection to recover its form and extend toward the first wall, to retain the trailer on the retaining claw. The spool is subsequently rotated to wind the photo film around the spool and into the cassette shell.

The pick-up device can be a tongue-like guide plate, and is prevented from being bent or curved inside the slot in the course of guiding the trailer. Also, the pickup device aids in the insertion of the trailer into the cassette.

In the present invention, the trailer is maintained in stable position inside the slot, and is engaged easily with the hooks. Even after the engagement of the hooks, the hooks cannot be moved by shock or vibration of the cassette.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
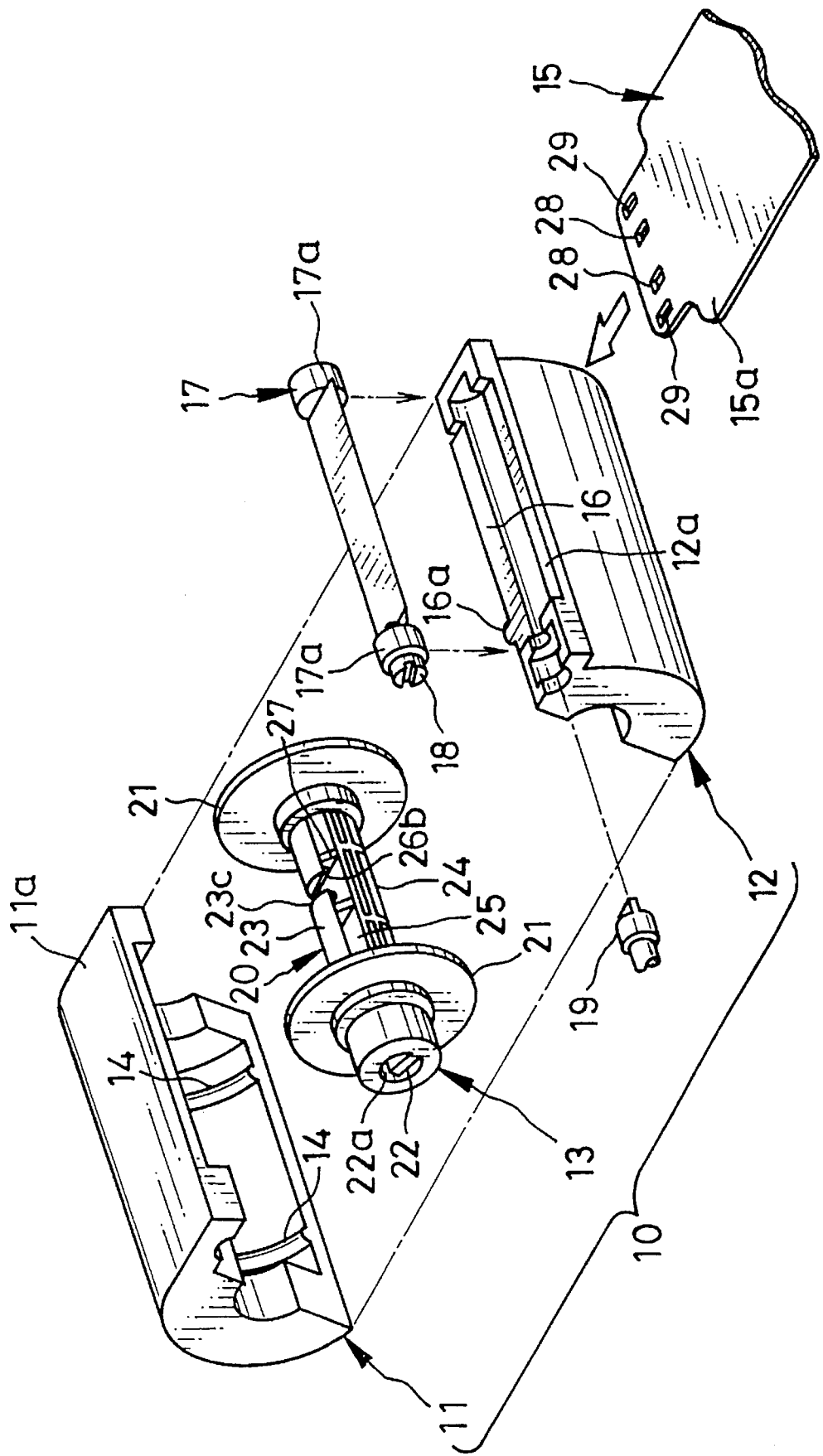
FIG. 1 is an exploded perspective view illustrating a photo film cassette of the preferred embodiment of the present invention, together with an opener for opening a shutter.
Figure 2:
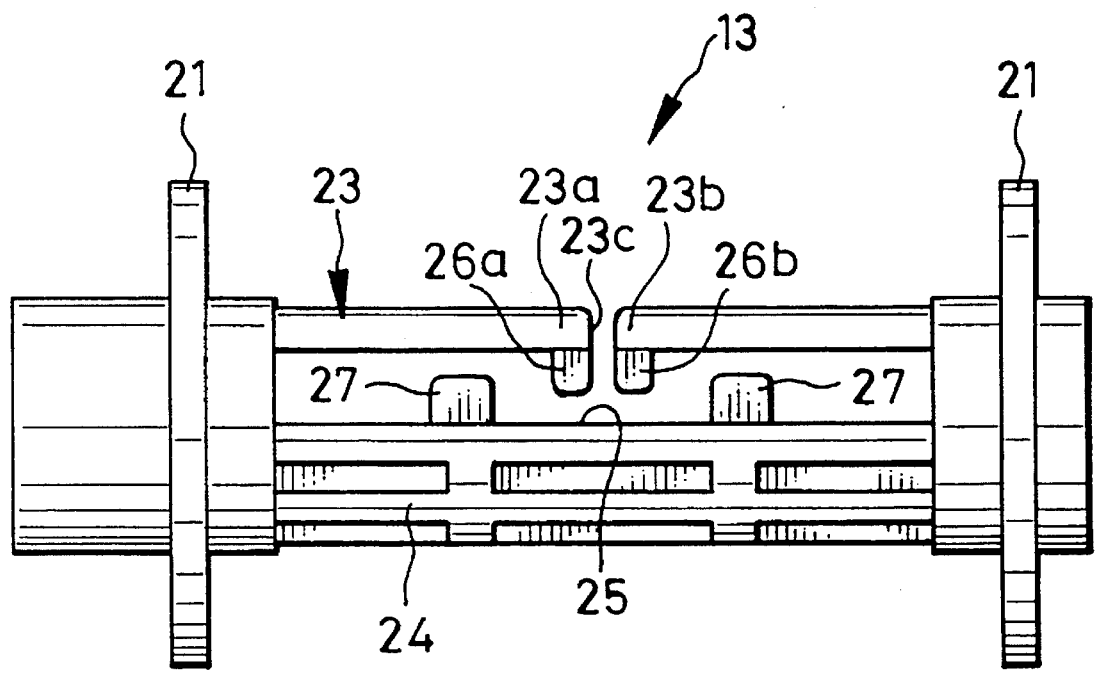
FIG. 2 is a front elevation illustrating a spool incorporated in the cassette of FIG. 1 and on which a trailer is to be retained.
Figure 3:
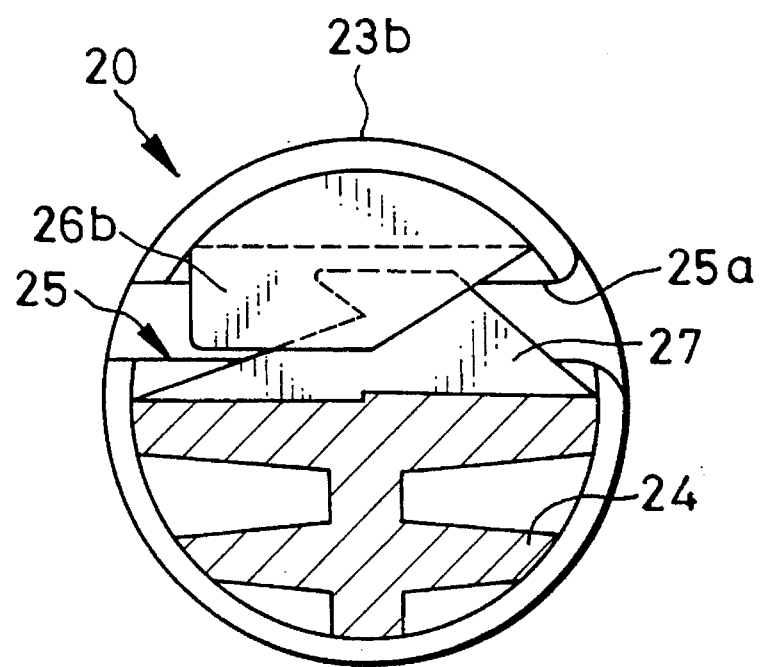
FIG. 3 is a cross section illustrating the spool.

FIGS. 1 to 3 illustrate a preferred embodiment. A spool 13 is disposed in a cassette shell 10 constituted of a pair of shell halves 11 and 12 molded from resin. Pairs of ridges 14 are formed on the inside of the shell halves 11 and 12. When photo film 15 is wound around the spool 13 and contained within a spool chamber between the shell halves 11 and 12, the ridges 14 are in contact with the outermost turn of the photo film 15 to prevent the roll of the photo film 15 from loosening. When the spool 13 is rotated in a direction to unwind the film 15, namely, clockwise in FIG. 1, the roll of the photo film 15 is rotated clockwise together with the spool 13. During rotation of the roll of the photo film 15, a leading end of the photo film 15 abuts on the separator claw 16a, which is formed on shell half 12, to separate the leading end from the roll of the film 15.

Port walls 11a and 12a are formed on the shell halves 11 and 12, respectively. With the shell halves 11 and 12 joined together, the port walls 11a and 12a define a photo film passage port 16. A shutter plate 17 is supported by the port walls 11a and 12a. Both ends of the shutter 17 are provided with rotary shaft portions 17a to be supported between the port walls 11a and 12a, so that the shutter 17 is rotatable about an axis parallel to the axis of the spool 13. An end of one of the shaft portions 17a has a key 18, which extends through a face of the cassette shell 10. When an opener member 19, of a camera or the like, is fitted on the key 18 and rotates the key 18, the shutter 17 is rotated in the range between positions of blocking and opening the passage port 16.

A pair of flanges 21 are formed on the spool 13. The photo film 15 is wound on a core 20 of the spool 13 between the flanges 21. Both ends of the spool 13 extend through faces of the cassette shell 10, and are provided with keys 22. The keys 22 are used for engagement with a drive member for rotating the spool 13 in a known manner. Each of the keys 22 has a notch 22a formed therein.

The core 20 is constituted of core walls 23 and 24, between which a slot 25 is formed. As illustrated in FIGS. 2 and 3, a central gap 23c is formed in the core wall 23 to render it flexible, and define two symmetrical flaps 23a and 23b, which respectively have slip-preventive ridges 26a and 26b formed thereon. The flaps 23a and 23b have a resilient tendency to elastically recover their original form. The resilient tendency is set so that the ridges 26a and 26b are shifted by 1 mm or more when a load of 200 grams is applied thereto, in the direction away from the rigid core wall 24. Two retaining hooks 27 are formed on the rigid core wall 24 at an interval which is wider than the ridges 26a and 26b. The right side of the slot 25, as viewed in FIG. 3, is formed to be an entrance 25a to receive insertion of a trailer 15a of the photo film 15 as illustrated in FIG. 1.

The trailer 15a of the photo film 15 as provided has two retaining holes 28 formed thereon, which are engaged with the retaining hooks 27. The ridges 26a and 26b press the trailer 15a in the direction opposite to projecting direction of the retaining hooks 27, so that the holes 28 are prevented from disengagement from the retaining hooks 27, even if a force for pulling the photo film 15 from the slot 25 is applied to the trailer 15a. The trailer 15a is further provided with two pick-up holes 29 at an interval which is wider than the retaining holes 28. The pick-up holes 29 are used during an insertion operation of the trailer 15a into the slot 25.

Figure 4:
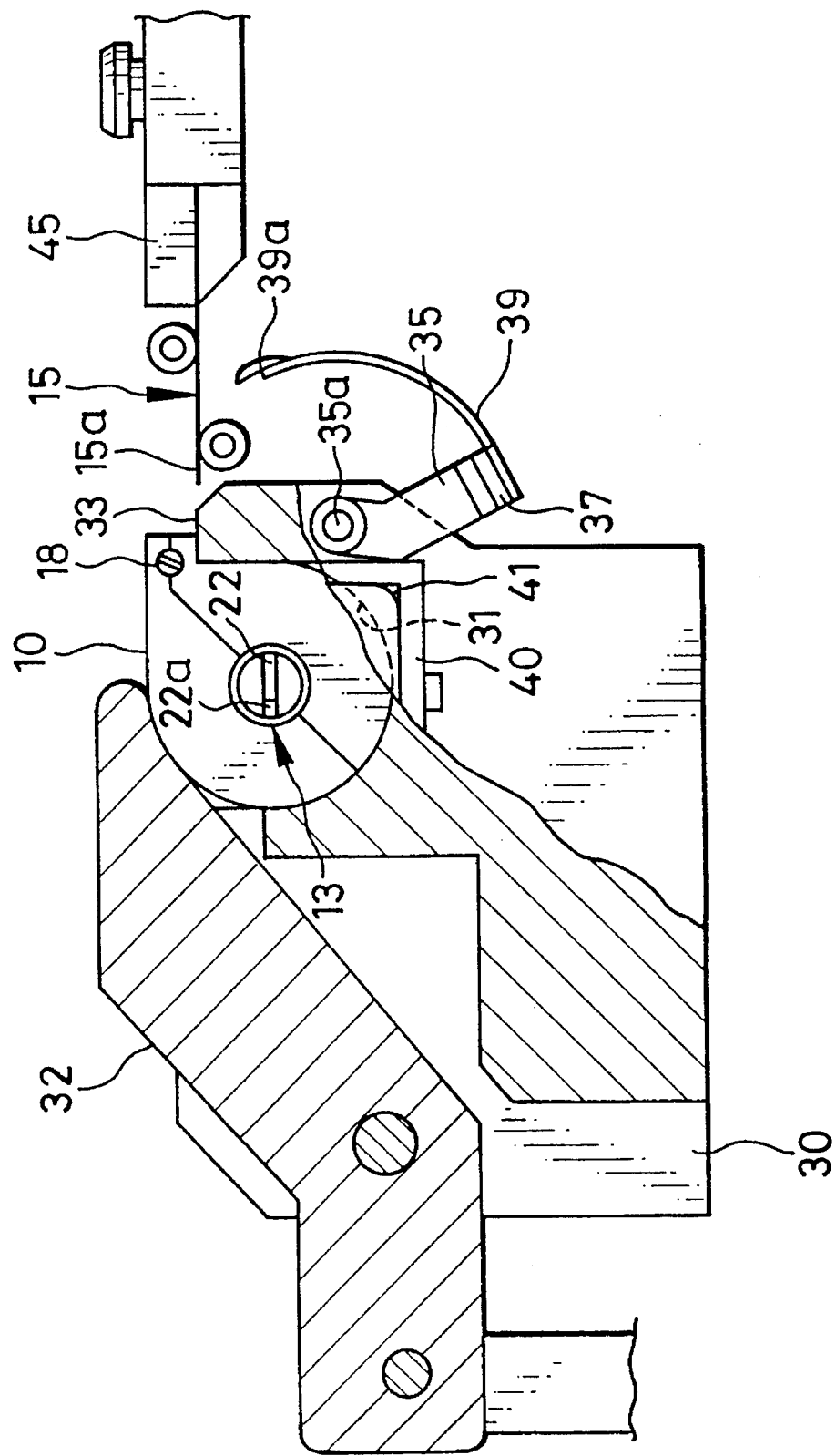
FIG. 4 is an explanatory view, in cross section partially broken, illustrating a preferred embodiment of the photo film loading apparatus and a cassette to be loaded with the photo film.

FIG. 4 illustrates a preferred embodiment of an apparatus for inserting photo film 15 into the cassette. The apparatus is adapted to fixing the photo film 15 on to the spool 13 and winding it thereabout, after the spool 13 and the shutter 17 have been mounted between the shell halves 11 and 12. A base 30 is provided with a holder 31 shaped in correspondence with the outline of the cassette shell 10 for receiving and supporting the cassette shell 10. On the base 30 is journaled a lever 32, which is driven by a hydraulic cylinder device or the like (not shown) through a linkage mechanism (not shown). When the cassette shell 10 is supplied into the holder 31, the lever 32 presses and holds the cassette shell 10 in the holder 31.

With the cassette shell 10 pressed by the lever 32, the cassette shell 10 is fixedly oriented, by positioning of the port wall 12a on a positioning edge 33, to direct the passage port 16 in a predetermined direction. Both lateral faces of the base 30 are provided with a pair of arms 35 journaled thereon with each shaft 35a. The arms 35 are driven by a stepping motor or the like (not shown). The arms 35 are connected with a connecting plate 37, which is used for attacking a clawed inserter jig 39 to the arms 35. The inserter jig 39 is arcuate, is formed of flexible thin metal, and is provided with pick-up claws 39a at its distal ends thereof.

Figure 6:
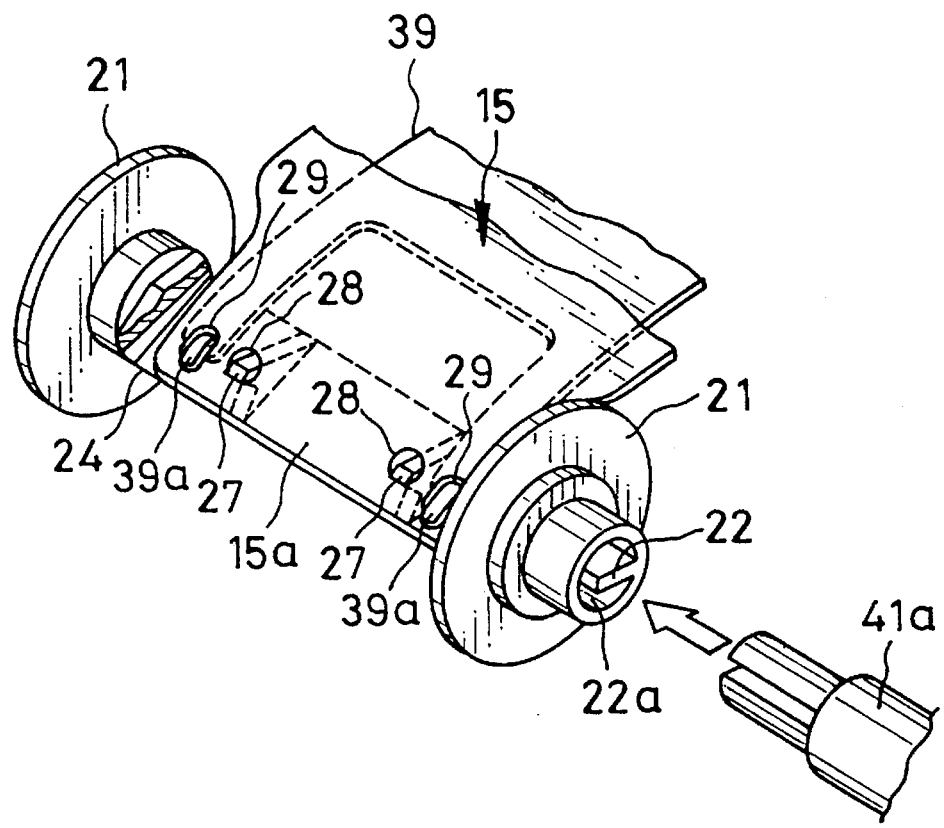
FIG. 6 is an explanatory view, in perspective partially broken, illustrating the spool with the photo film and a spool driving mechanism.

A slide frame 40 is arranged on one lateral face of the base 30 to be slidable toward, and away from, an end face of the cassette shell 10, and is adapted to support a drive unit 41. The drive unit 41 selectively rotates the spool 13 and the shutter 17, and includes a fork 41a (see FIG. 6) for engagement with the key 22 of the spool 13, a motor for driving the fork 41a, the opener member 19 for engagement with the key 18, and a motor for driving the opener 19. The slide frame 40 is in the retracted position before the cassette shell 10 is set in the holder 31, and is moved to the drive position after setting the cassette shell 10 in the predetermined orientation. The opener 19 for the shutter 17 and the fork 41a for the spool 13 are respectively engaged with the keys 18 and 22.

As shown in FIG. 4, the spool end is provided with the key 22 an the notch 22a. Note that, as discussed above, the opposite spool end is also provided with a key 22 and a notch 22a. The inside face of the base 30 in opposition to the drive unit 41 is provided with a sensor as (not shown), such as a photo sensor which detects the position of the notch 22a in the spool 13, so as to check the rotational position of the spool 13 with reference to the predetermined orientation for positioning the slot 25.

A feeder 45 of the photo film 15 is arranged to face the base 30. The feeder 45 is connected to a device for supplying the photo film 15. Each time one strip of photo film 15 is cut off and contained into the cassette shell, the feeder 45 holds a trailer 15a in position for standby. When the trailer 15a is protruded from the feeder 45, the holes 29 are positioned in a predetermined positional relationship with respect to the pick-up claws 39a.

Figure 5:
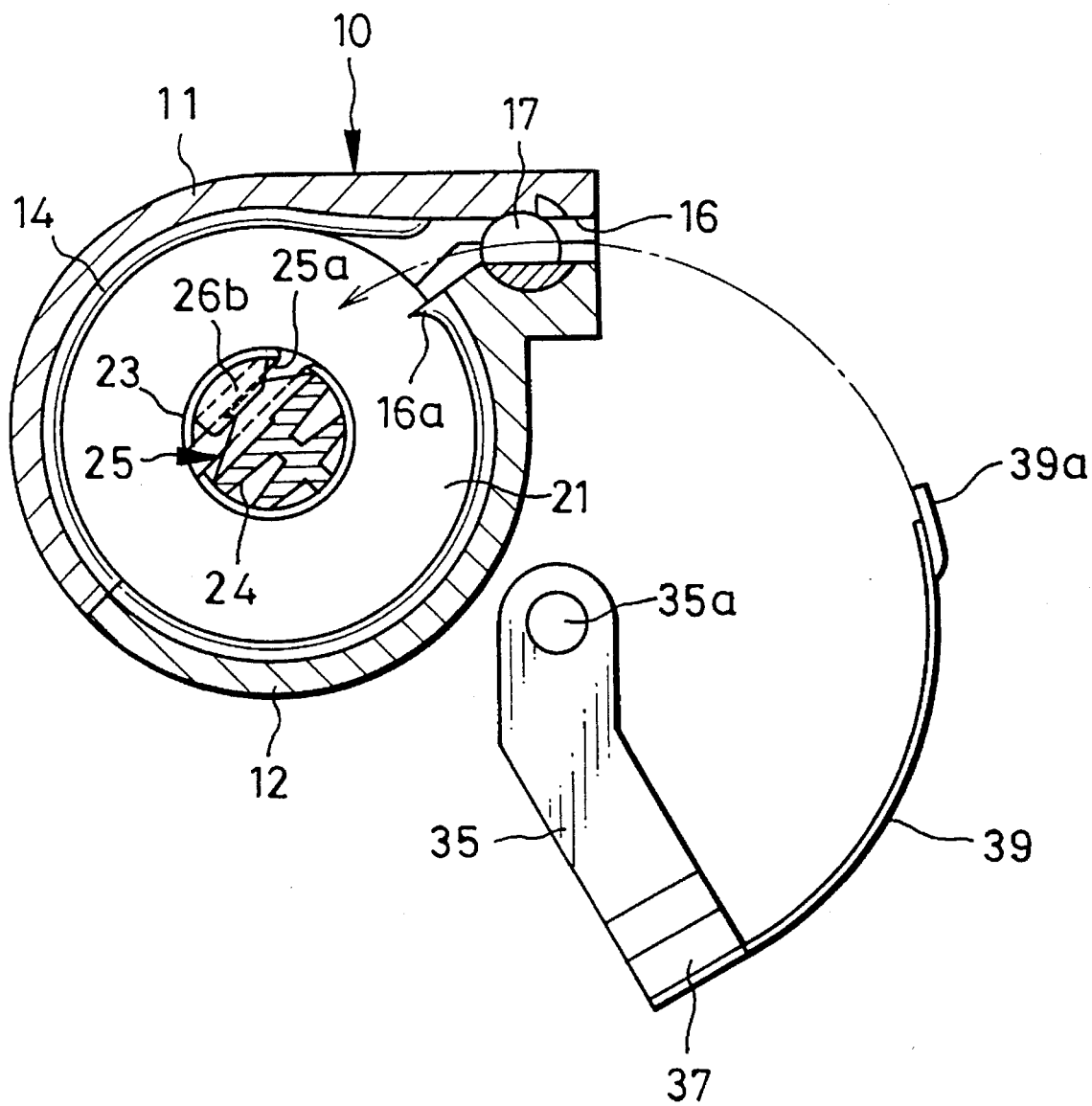
FIG. 5 is an explanatory view, in cross section, illustrating the photo film cassette with an inserter jig of the loading apparatus.

FIG. 5 illustrates relative positions of the cassette shell 10 and the arm 35 while the cassette shell 10 is positioned by the holder 31 and the edge 33. The shaft 35a is substantially equally distant from the slot 25 in the core 12a, the passage port 16, and the new claw 39a. When the arm 35 is rotated counterclockwise from the standby position of FIG. 5, the claw 39a is passed through the passage port 16 and is eventually brought into the slot 25 within the core 12a.

The operation of the inserting the photo film 15 into the cassette shell 10 is described below. The cassette shell 10 is assembled with the new spool 3 in an illuminated room, i.e., not in a darkroom. The empty cassette therefore can be assembled reliably and easily, together with the shutter 17 and other separate parts, such as an indicator member for unexposed and exposed states, and a regulating member for rotation of the spool. The cassette shells 11 and 12 are secured together firmly by ultrasonic welding, hook engagements, or other known methods.

The empty cassette thus assembled is brought into a darkroom, and set into the photo film loading apparatus illustrated in FIG. 4. To set the empty cassette, the lever 32 is in the open position. The slide frame 40 is retracted. With the cassette shell 10 is set in the holder 31, the lever 32 is swung to the pressing position to hold the cassette shell 10 on the holder 31 and the edge 33 in the predetermined orientation. The slide frame 40 is next moved to the drive position where the fork 41a is engaged with the key 22 and the opener 19 is engaged with the key 18.

When the opener 19 and the fork 41a are firmly engaged with the respective keys 18 and 22, the drive unit 41 is actuated to drive the spool 13 in the winding direction, namely counterclockwise in FIG. 4. The sensor inside the base 30 monitors the position of the notch 22a at the key 22 and, when the notch 22a has come to the predetermined position, sends a stop signal to the drive unit 41. The spool 13 is stopped to direct the entrance 25a of the slot 25 toward the passage port 16. Note that it is possible to regulate the rotational orientation of the spool 13 beforehand during the transportation of the empty cassette into the holder 31. In such a case, the sensor can be omitted from the base 30.

The opener 19 is driven by the drive unit 41 to rotate the shutter 17 to open the passage port 16. The stepping motor is then energized to drive the arm 35 to rotate through a predetermined angle. The inserter jig 39 rotates together with the arm 35, to engage the pick-up claws 39a with the holes 29 in the trailer 15a of the photo film 15. Further rotation of the arm 35 causes the pick-up claws 39a to pick up the trailer 15a and pull the photo film 15 from the feeder 45. The pick-up claws 39a with the trailer 15a are inserted through the passage port 16, and then into the slot 25 between the core walls 23 and 24. In the course of insertion of the pick-up claws 39a, the trailer 15a is forced into the space between the flexible core wall 23 and the tops of the retaining hooks 27.

The core wall 23 consists of the two flexible separate flaps 23a and 23b as described above. The ridges 26a and 26b shift 1 mm or more under a load of 200 grams. Therefore the ridges 26a and 26b are pressed by the trailer 15a advancing into the slot 25, until the flexible flaps 23a and 23b are flexed away from the rigid core wall 24. The pick-up claws 39a, during the insertion, never receive any resistance of the ridges 26a and 26b. It is thus possible with ease to advance the trailer 15a fully into the slot 25. Were it not for the gap 23c, both core walls would be rigid and would provide excessive resistance to the trailer 15a. With the gap 23c imparting flexibility to the core wall 23, the trailer 15a is not greatly deformed even when in contact with the ridges 26a and 26b. When the retaining holes 28 reach the retaining hooks 27, the hooks 27 are fitted in the holes 28. The ridges 26a and 26b then recover their original positions resiliently, and press the trailer 15a toward the rigid core wall 24. It follows that the retaining hooks 27 retain the retaining holes 28 firmly without risk of disengagement.

With the trailer 15a retained on the core 20 of the spool 13, the arm 35 rotates back to the standby position, while pulling the pick-up claws 39a out of the cassette shell 10. The retaining hooks 27 are shaped to keep the photo film 15 from moving in the direction toward the passage port 16. Once the holes 28 are retained on the retaining hooks 27, the holes 28 will not become disengaged from the slot 25 when the inserter jig 39 is pulled out of the slot 25. It is noted that, to remove the inserter jig 39 from the cassette, it is possible to rotate the spool 13 counterclockwise first, until the inserter jig 39 is removed from the slot 25. The arm 35 can then be rotated clockwise to pull the inserter jig 39 out of the cassette shell 10. This alternative operation is possible due to the flexible thin characteristic of the inserter jig 39.

After the arm 35 is brought back to the standby position, the fork 41a of the drive unit 41 is driven to rotate the spool 13 in the counterclockwise direction. The photo film 15 is thus wound up around the core 20 of the spool 13. The photo film 15 is further drawn out of the feeder 45 by tension due to rotation of the spool 13, while being wound into the cassette shell 10. When a predetermined length of the photo film 15 is passed through the feeder 45, the spool 13 is stopped from rotating. A cutter incorporated in the supply device of the photo film is actuated to cut the photo film 15. A rear end of the photo film 15 in the course of being wound is cut out by the cutter into the shape of the leader, at the same time as a front end of next strip of photo film is cut out by the cutter into the shape of the trailer, in which the holes 28 and 29 are further punched.

After the strip of the photo film 15 is cut off, the spool 13 is driven to wind up the photo film 15 entirely into the cassette shell 10. Upon winding the leader of the photo film 15 into the cassette shell 10, the spool 13 is stopped. The opener 19 is rotated clockwise, to move the shutter 17 to the blocking position to close the passage port 16. In this state, the inside of the cassette shell 10 is shielded completely from ambient light. The lever 32 is retracted to the releasing position. The cassette shell 10 with the photo film 15 contained is removed from the holder 31, for which another empty cassette is supplied. The operation of loading a cassette with photo film 15 is repeated similarly.

The operation of the apparatus can be controlled in a known manner by a microprocessor based controller or the like. Also, known devices can be used for sensing and driving the various members. Finally, one skilled in the art will readily be able to select the form and material of the spool to attain the critical strength thereof in light of the disclosure herein.

Figure 7:
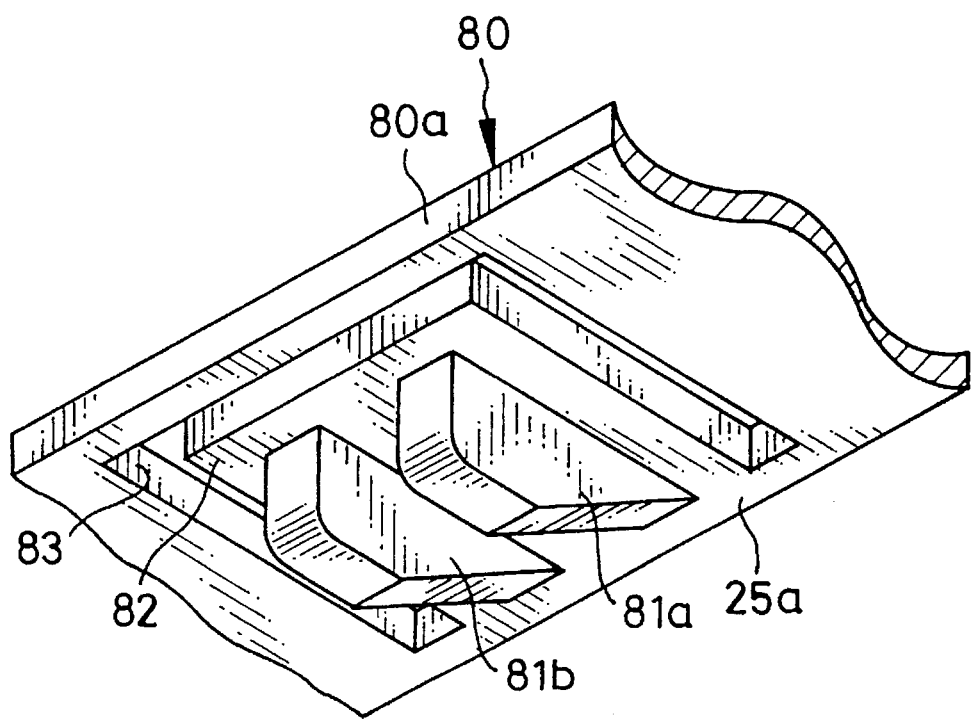
FIG. 7 is an explanatory view, in bottom perspective, illustrating a partly flexible core wall of a spool of another preferred embodiment.

FIG. 7 partially illustrates a core 80 of another preferred spool, in which a partly flexible core wall 80a is used in combination with the former rigid core wall 24. A channel-shaped cutout 83 is formed in the core wall 80a to define a flexibly resilient flap 82. Two slip-preventive ridges 81a and 81b are formed on the flexible flap 82 proximate entrance 25a.

Although the present invention has been fully described by way of the preferred embodiments thereof with reference to the accompanying drawings, various changes and modifications will be apparent to those having skill in this field without departing from the scope of the present invention as defined by the appended claims.

What is claimed is:

1. A photo film cassette including a spool having a core, two flanges disposed on said core, photo film of which a trailer is secured on said core and which is wound on said spool in the form of a roll, and a cassette shell for rotatably containing said spool and said roll of said photo film, said photo film cassette comprising:

at least one retaining hole formed in said trailer of said photo film;

a slot formed in said spool and extended in an axial direction of said core, for receiving said trailer, said slot being defined by first and second walls, said second wall being defined by at least one cantilever member, said cantilever member having a fixed end and a free end;

at least one retaining claw projecting from said first wall into said slot for being fitted in said retaining hole to retain said trailer in said slot; and at least one preventive projection projecting from said second wall into said slot to press said trailer towards said retaining claw and prevent said retaining claw from coming out of said hole, said preventing projection being disposed on said free end to be retractable away from said first wall.

2. A photo film cassette as defined in claim 1, wherein said cassette shell is constituted of first and second resinous shell halves, and said spool is resinous.

3. A photo film cassette as defined in claim 2, wherein said photo film has a leader, which is exited from said cassette shell, when said spool is rotated in an unwinding direction of said roll of said photo film.

4. A photo film cassette as defined in claim 3, wherein said cantilever member is elastically deformable so that an original form is recoverable resiliently, said cantilever member constitutes at least part of said second wall.

5. A photo film cassette as defined in claim 4, wherein said cantilever member is formed so that when load of 200 grams is applied to said preventive projection, said preventive projection is shifted at least 1 mm.

6. A photo film cassette as defined in claim 4, wherein said cassette includes two cantilever member disposed in opposition to said first wall as to constitute said second wall, each of said cantilever members has one of said preventive projections formed thereon.

7. A photo film cassette as defined in claim 6, wherein one of said preventive projection is disposed on a free end of each of said flap portions.

8. A photo film cassette as defined in claim 4, wherein said second wall has a cutoff formed in a channel-shape to define said cantilever flap portion.

9. A photo film cassette as defined in claim 8, wherein said slot has an entrance for receiving said trailer into said slot, said flap portion has a free end located past said entrance inside said slot.

10. A photo film cassette as defined in claim 4, wherein a center of said slot is deviated from a center of said core.

11. A photo film cassette as defined in claim 4, wherein at least one pick-up hole is formed in said trailer, and picked up by at least one external pick-up claw to be mounted on said spool.

12. A photo film cassette as defined in claim 11, wherein said pick-up hole is arranged beside said retaining hole.

13. A photo film cassette as defined in claim 12, wherein said cassette shell has a photo film passage port extending between an inside of said cassette shell and an outside thereof, and a shutter is mounted in said passage port for preventing ambient light from entering said cassette shell, said shutter being displaceable between closed and open positions, and when in said closed position, said shutter blocks said passage port to prevent ambient light from entering said cassette shell, and when in said open position, said shutter opens said passage port to allow passage of said photo film through said passage port.

14. A photo film cassette as defined in claim 13, wherein said passage port is defined by lower and upper walls disposed in opposition to each other, and said shutter is a plate constituting part of said lower wall, and when in said closed position, said plate is erected across said passage port, and when in said open position, is laid in opposition to said upper wall.

15. A photo film cassette as defined in claim 14, further comprising a separator claw disposed on said lower wall and near said roll for separating a leader of said photo film from said roll around said spool.

16. A photo film cassette as defined in claim 15, wherein shaft portions are formed on respective ends of said shutter, and are received on said cassette shell rotatably, and at least one of said shaft portions extends through said cassette shell to be operable externally.

17. A photo film cassette as defined in claim 16, wherein said operable shaft portion of said shutter is located on a face where an end of said spool to be driven is located.

18. A photo film cassette including a spool having a core, photo film of which a trailer is secured on said core and which is wound on said spool in the form of a roll, and a cassette shell for rotatably containing said spool and said roll of said photo film, wherein said cassette shell is constituted of first and second resinous shell halves, and said spool is resinous, said photo film has a leader, which is exited from said cassette shell, when said spool is rotated in an unwinding direction of said roll of said photo film, said photo film cassette comprising:

at least one retaining hole formed in said trailer of said photo film;

a slot formed in said spool and extended in an axial direction of said core, for receiving said trailer, said slot being defined by first and second walls, a center of said slot being deviated from a center of said core;

at least one retaining claw projecting from said first wall into said slot for being fitted in said retaining hole to retain said trailer in said slot; and at least one preventive projection projecting from said second wall into said slot to press said trailer towards said retaining claw and prevent said retaining claw from coming out of said hole, said preventing projection being disposed on a resilient member to be retractable away from said first wall, said resilient member comprises at least one cantilever flap portion which is elastically deformable so that an original form is recoverable resiliently, wherein said flap portion constitutes at least part of said second wall, and said preventive projection is disposed on said flap portion.

19. A photo film cassette as defined in claim 18, wherein said slot has an entrance for receiving said trailer into said slot, and said preventive projection has an inclined face formed thereon and decreasing in height toward said entrance.

20. A photo film cassette as defined in claim 19, further comprising reference means disposed in an end of said spool for signaling a rotational orientation of said spool.

21. A photo film cassette as defined in claim 20, wherein said reference means is a hole formed in an end of said spool and visible from an exterior of said cassette shell.

* * * * *